(12) United States Patent
Sakurai et al.

(10) Patent No.: US 7,083,031 B2
(45) Date of Patent: Aug. 1, 2006

(54) POWER TRANSMITTING APPARATUS WITH INPUT AND OUTPUT MEMBER ROTATABLY ARRANGED WITHIN A CASE

(75) Inventors: Yoshimi Sakurai, Shizuoka (JP); Naoyuki Miwa, Shizuoka (JP); Akio Ooishi, Shizuoka (JP); Katsu Yoshimoto, Shizuoka (JP)

(73) Assignee: Kabushiki Kaisha F.C.C. (JP)

( * ) Notice: Subject to any disclaimer, the term of this patent is extended or adjusted under 35 U.S.C. 154(b) by 0 days.

(21) Appl. No.: 10/901,499

(22) Filed: Jul. 28, 2004

(65) Prior Publication Data
US 2005/0023099 A1 Feb. 3, 2005

(30) Foreign Application Priority Data
Jul. 29, 2003 (JP) ............................. 2003-203070

(51) Int. Cl.
*F16D 27/115* (2006.01)
(52) U.S. Cl. .................... 192/35; 194/84.7; 194/113.36
(58) Field of Classification Search .................. 192/35, 192/113.36
See application file for complete search history.

(56) References Cited
U.S. PATENT DOCUMENTS
2,907,426 A 10/1959 Jacobs

| 5,953,959 | A | * | 9/1999 | Organek et al. ............... 74/339 |
|---|---|---|---|---|
| 6,481,548 | B1 | * | 11/2002 | Monahan et al. ............. 192/38 |
| 6,662,920 | B1 | * | 12/2003 | Hofer et al. .................. 192/35 |
| 2003/0183471 | A1 | | 10/2003 | Bassett et al. |

FOREIGN PATENT DOCUMENTS

| CH | 315 800 | | 8/1956 |
|---|---|---|---|
| EP | 1 221 393 | | 7/2002 |
| JP | 05-065925 | * | 3/1993 |
| JP | 2820161 | | 8/1998 |

\* cited by examiner

*Primary Examiner*—Saul Rodriguez
(74) *Attorney, Agent, or Firm*—Harness, Dickey & Pierce, P.L.C.

(57) ABSTRACT

A power transmission apparatus with a reaction force converted by a boosting mechanism used as a fastening force for an electromagnetic clutch has a solenoid (4); an electromagnetic clutch including a rotor (5) for transmitting the magnetic flux of the solenoid (4); an armature (8) attracted onto the rotor (5) by the magnetic flux, and a return spring (13) urging the armature (8) in a direction away from the rotor (5) to create a clearance "t" therebetween. A boosting mechanism converts a torque of the input member (housing) (2) to an axial thrusting force when the armature of the electromagnetic clutch is attracted onto the rotor. A main clutch connects the input member (2) and the output member (shaft) (3) via the thrusting force generated by the boosting mechanism. This transmits the torque of the input member (2) to the output member (3).

7 Claims, 4 Drawing Sheets

POWER TRANSMITTING APPARATUS WITH INPUT AND OUTPUT MEMBER ROTATABLY ARRANGED WITHIN A CASE

CROSS-REFERENCE TO RELATED APPLICATIONS

This application claims priority to Japanese Patent Application No. 2003-203070, filed Jul. 29, 2003, which application is herein expressly incorporated by reference.

FIELD OF THE INVENTION

The present invention relates to a power transmitting apparatus with an input member and an output member rotatably arranged within a case, secured on a stationary member. The power of the input member (or housing) can be transmitted to the output member (or shaft) or cut off therefrom by appropriately carrying out connection/cut-off between the input and out put members.

BACKGROUND OF THE INVENTION

Prior art power transmitting apparatus usually include an electromagnetic clutch having for example an electromagnet and pilot clutch, a boosting mechanism formed by a cam, and a main clutch formed by a wet multiple disc clutch. A fastening torque is caused in the pilot clutch by energizing the electromagnet. A fastening force of the main clutch is caused by the boosting mechanism in accordance with the capacity of the fastening torque. The main clutch is connected by its fastening force (i.e. clutch plates and clutch discs of the multiple disc clutch are connected) to transmit the rotational power of the input member to the output member.

The reaction force of the boosting mechanism, resisting force against the fastening force applied to the main clutch, is supported by a case forming a box of the power transmitting apparatus. The torque capacity of the pilot clutch is controlled by an electric current supplied to the electromagnet. That is, the transmitting torque capacity of the power transmitting apparatus can be controlled by controlling the current supplied to the electromagnet. Such a power transmitting apparatus of the prior art is disclosed for example in Japanese Patent No. 2820161.

However, in the prior art power transmitting apparatus, although it is possible to increase the torque capacity by increasing the current supplied to the electromagnet, the torque capacity is limited since the transmittable torque capacity is saturated when the magnetic flux density in the magnetic path of the electromagnet approaches the saturation magnetic flux density of material of the pilot clutch. In addition, since the electromagnet, pilot clutch, and the boosting mechanism etc. are arranged within the case, the power transmitting apparatus of the prior art is oversized even if compared with a hydraulic multiple disc clutch having the same torque capacity.

SUMMARY OF THE INVENTION

It is, therefore, an object of the present invention to provide a power transmitting apparatus which can transmit a large torque even if a small amount of electric current is supplied to the electromagnet as well as to miniaturize it.

According to the present invention, a power transmitting apparatus has an input member and an output member rotatably arranged within a case secured on a stationary member. The power of the input member can be transmitted to the output member or cut off therefrom by appropriately carrying out connection/cut-off between the input and output members. The power transmitting apparatus includes an electromagnet secured on the case and generating magnetic flux when it is energized. An electromagnetic clutch includes a rotor to transmit the magnetic flux, an armature attracted onto the rotor by the magnetic flux transmitted through the rotor, and a return spring arranged between the rotor and the armature. The spring usually urges the armature in a direction away from the rotor to create a clearance therebetween when the electromagnet is not energized. A boosting mechanism converts a torque of the input member to an axial thrusting force when the armature of the electromagnetic clutch is attracted onto the rotor. A main clutch connects the input member and the output member via the thrusting force generated by the boosting mechanism and transmits the torque of the input member to the output member so that the reaction force of the thrusting force generated by the boosting mechanism can be used as the fastening force of the electromagnetic clutch.

It is preferable that the boosting mechanism has a cam surface formed on the armature and a cam to generate the thrusting force of the boosting mechanism via the movement of the cam surface caused by the attraction and rotation of the armature.

It is also preferable that the return spring has an urging force which is sufficiently large to overcome the thrusting force generated at the boosting mechanism by a dragging torque caused by the return spring when the electromagnet is not energized. However, the force is sufficiently small so as to be defeated by the attractive force to attract the armature onto the rotor when the electromagnet is energized.

It is preferable that the rotor is mounted on the input member via a threaded engagement therebetween and further fastened thereto by a lock bolt.

It is also preferable that the rotor, the armature and the boosting mechanism are rotatably mounted on the side of the input member.

It is preferable that oil is contained within the case. Grooves are formed on the sliding surfaces of the armature and the rotor in the electromagnetic clutch or on the sliding surfaces of the main clutch to guide the oil toward their peripheries.

It is also preferable that the main clutch is a multiple disc clutch.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

The following description of the preferred embodiments is merely exemplary in nature and is in no way intended to limit the invention, its application, or uses.

A power transmitting apparatus of the present invention comprises an input member and an output member rotatably arranged within a case secured on a stationary member. The power of the input member can be transmitted to the output member or cut off therefrom by appropriately carrying out connection/cut-off between the input and output members. This power transmitting apparatus can be applied for example to a vehicle shown in FIG. 1 which can be switched either to a two-wheel drive or a four-wheel drive.

Figure 1:
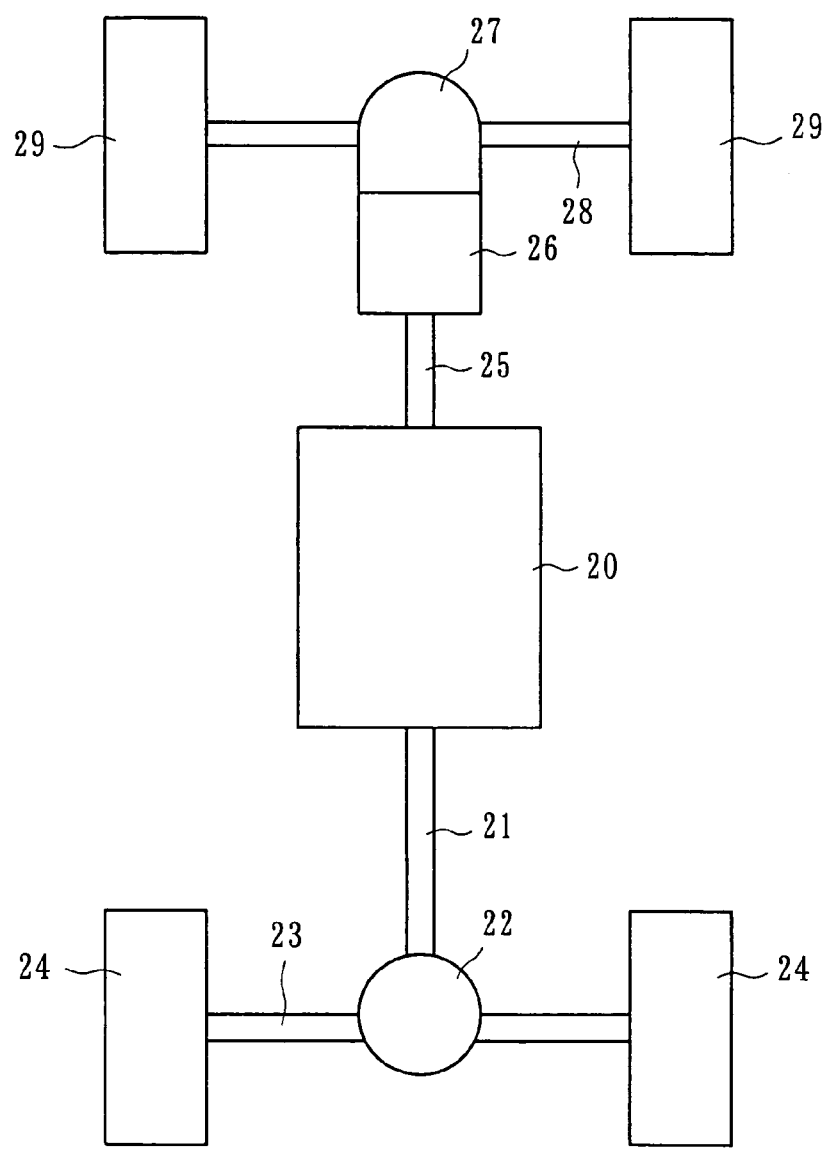
FIG. 1 is a schematic view showing a vehicle to which the power transmission apparatus of one embodiment of the present invention is applied.

FIG. 1 illustrates a driving force of an engine/transmission 20 transmitted to rear wheels 24 via a rear propelling shaft 21. A rear differential gear unit 22 and rear drive shafts 23 drive the vehicle under the two-wheel drive condition when a power transmitting apparatus 26 of the present invention is switched "OFF". On the contrary, when the power transmitting apparatus 26 of the present invention is switched "ON", the driving force of the engine/transmission 20 is also transmitted to front wheels 29 via a front propelling shaft 25. The power transmitting apparatus 26, front differential gear unit 27 and front drive shafts 28 drive the vehicle under the four-wheel drive condition.

Figure 2:
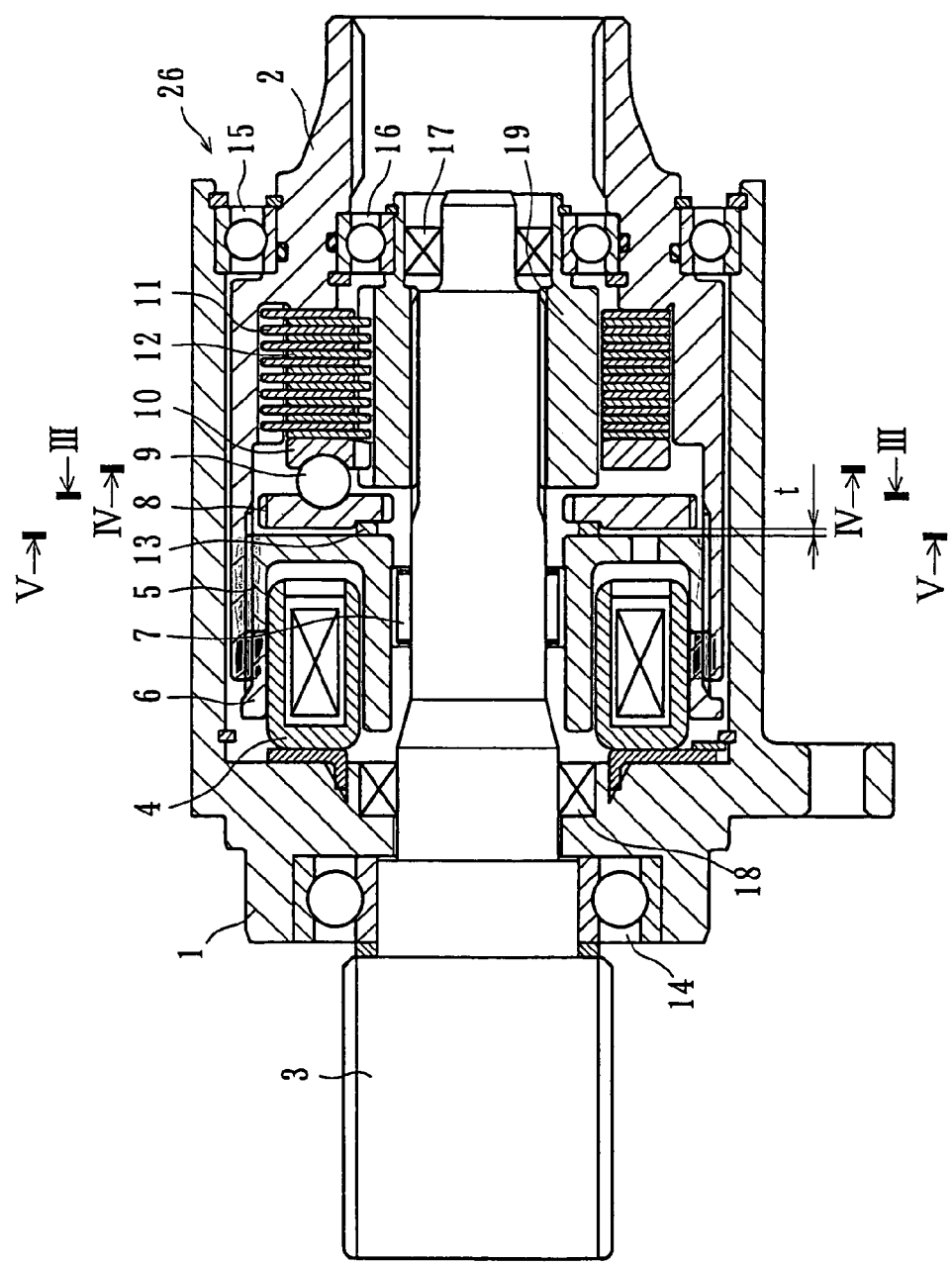
FIG. 2 is a longitudinal section view of a power transmission apparatus of the present invention.

As shown in FIG. 2, the power transmitting apparatus 26 of the present invention includes a case 1 forming a box which contains ends of an input member (housing) 2 and an output member (shaft) 3. A solenoid (an electromagnet) 4 is arranged at the side of case 1. A rotor 5, armature 8, a return spring 13, balls 9, and a main clutch including a pressure cam 10, clutch plate 11 and clutch disc 12 are arranged at the side of the housing 2.

The solenoid 4 is adapted to be energized, at any appropriate timing, via electric wires (not shown) and to generate magnetic flux when it is energized. The rotor 5 is mounted on the housing or input member 2 via a threaded engagement. The rotor 5 is intended to transmit the magnetic flux generated during energization of the solenoid 4 to the armature 8.

The rotor 5 is further fastened to the input member 2 by a lock bolt 6. The lock bolt 6 prevents loosening of the rotor 5 as well as making it possible to easily set a clearance "t" between the rotor 5 and the armature 8. Accordingly, since the positioning of the rotor 5 can be achieved by adjusting the amount of fastening of the lock bolt 6 relative to the rotor 5, the clearance "t" is easily set without use of any special tool, such as a shim.

A needle bearing 7 is arranged between the outer peripheral surface of the output member or shaft 3 and the inner peripheral surface of the rotor 5. Accordingly, when the input member 2 and the output member 3 are not connected, via the main clutch, the needle bearing 7 enables free rotation of the rotor 5 or the input member 2 relative to the shaft or the output member 3.

The armature 8 is positioned apart from the rotor 5 by the clearance "t" by interposition of a return spring 13 when the solenoid 4 is not energized. The armature 8 is attracted to the end surface (the right end surface in FIG. 2) of the rotor 5 against the urging force of the return spring 13 when the solenoid 4 is energized. In such an arrangement, the rotor 5, the armature 8, and the return spring 13 form the electromagnetic clutch of the present invention.

It is preferable to set the clearance "t" within a range of about 0.1~1.0 mm. This makes it possible to reduce the attractive force of the armature 8 and the electric power consumption as well as the lash caused between the normal and reverse rotation of the input member 2.

The return spring 13 has an urging force that is sufficiently large so as to overcome the thrusting force generated at a boosting mechanism (described later) by a dragging torque caused by the return spring 13 during non-energizing of the solenoid (electromagnet) 4. However, the force is sufficiently small so as to be overcome by the attractive force, attracting the armature 8 to the rotor 5, during energizing of the solenoid 4. This makes it possible to keep the clearance "t" between the armature 8 and the rotor 5 during non-power transmitting phases and to keep the attracted and connected condition of the armature 8 onto the rotor 5 during power transmitting phases.

Figure 3:
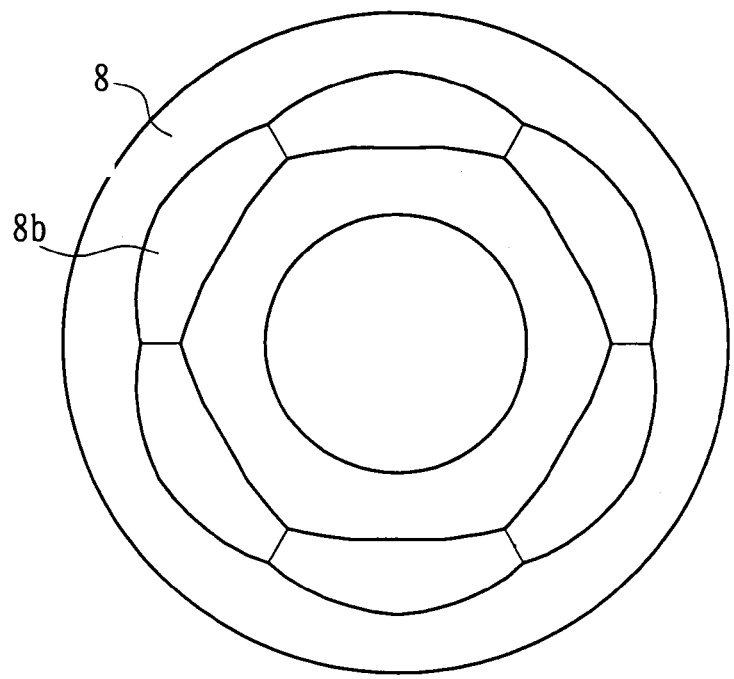
FIG. 3 is a schematic view taken along a line III—III of FIG. 2 showing a surface of an armature on which cam surfaces are formed.
Figure 4:
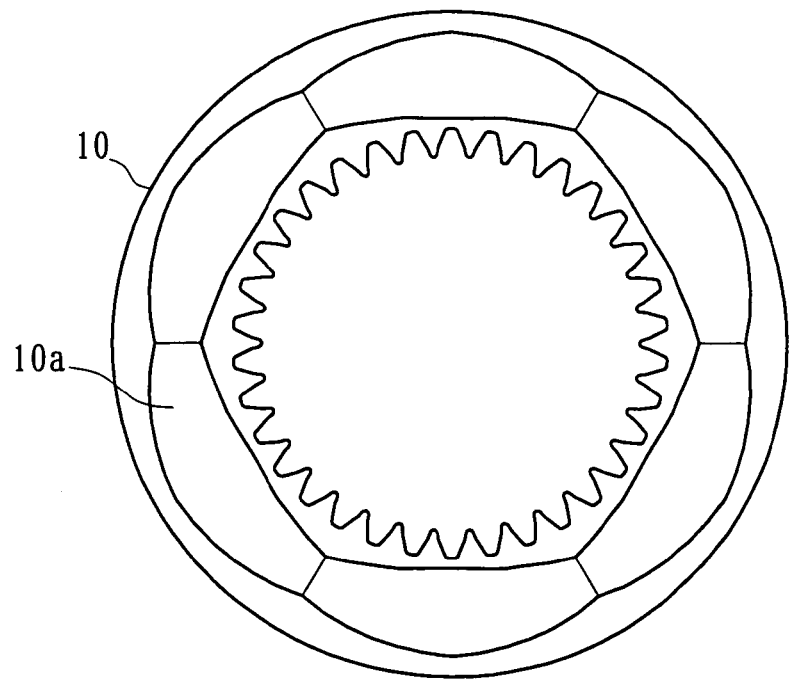
FIG. 4 is a schematic view taken along a line IV—IV of FIG. 2 showing a surface of a pressure cam on which cam surfaces are formed.
Figure 5:
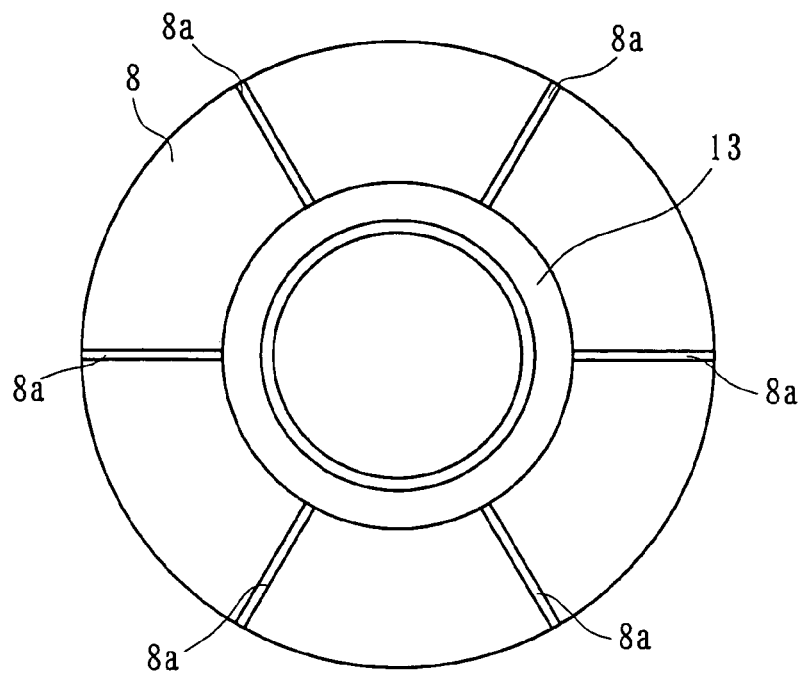
FIG. 5 is a schematic view taken along a line V—V of FIG. 2 showing a surface of an armature on which a return spring is arranged.

As shown in FIG. 3, cam surfaces 8b, for holding balls 9, are formed on the surface of the armature 8 opposite to the rotor 5 (i.e. the right surface of the armature 8 in FIG. 2). The balls 9 roll along the cam surfaces 8b upward and simultaneously move axially toward the right-hand direction in FIG. 2 when the armature 8 is attracted to and moves toward the rotor 5 and begins its rotation together with the rotor 5.

The balls 9 are sandwiched between the armature 8 and the pressure cam 10. A ball holding surface on the pressure cam 10 is formed with cam surfaces 10a similar to the cam surfaces 8b of the armature 8. Accordingly, when the balls 9 roll along the cam surfaces 8b of the armature 8 upward and simultaneously move axially toward the right-hand direction in FIG. 2, the balls 9 simultaneously roll along the cam surfaces 10a of the cam 10. Accordingly, the rotational torque of the housing or the input member 2 is thus converted to the axial thrusting force of the balls 9. Thus the cam mechanism formed by the cam surfaces 8b of the armature 8, the cam surfaces 10a of the pressure cam 10 and the balls 9 comprises the boosting mechanism of the power transmitting apparatus 26 of the present invention.

The axial thrusting force caused by the boosting mechanism strongly urges the clutch discs 12 against the clutch plates 11 which form the main clutch of the power transmitting apparatus 26. Thus, the rotational torque of the input member 2 can be transmitted to the output member 3 via a clutch hub 19. Accordingly, the housing or the input member 2 and the shaft or the output member 3 are mutually connected, via the main clutch, and rotate together.

Figure 6:
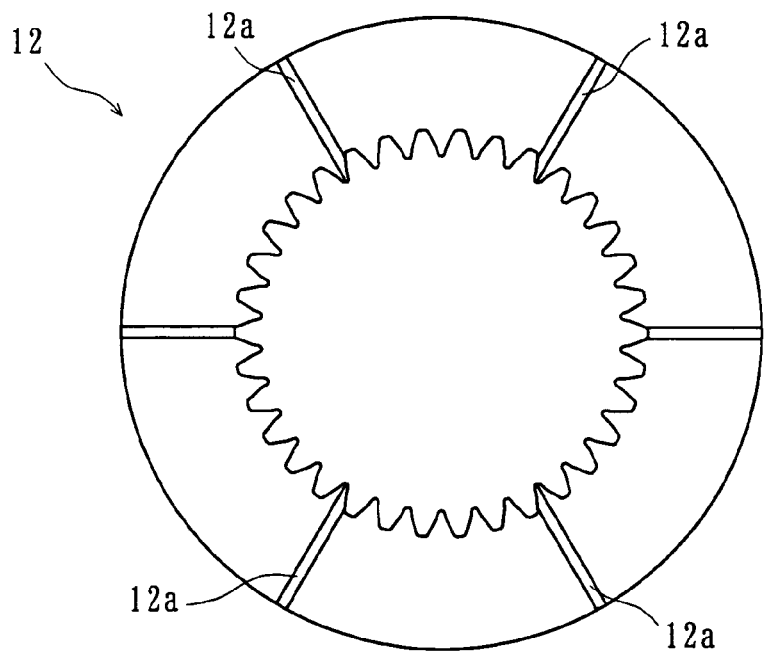
FIG. 6 is a schematic view showing a sliding surface of a clutch disc with which a clutch plate contact.

As shown in FIG. 6, a surface of each clutch disc 12 in sliding contact with the clutch plate 11 is formed with grooves 12a. The grooves 12a extend radially outwardly toward the outer periphery of the clutch disc 12. These grooves 12a can guide and discharge oil present between sliding surfaces of the clutch discs 12 and the clutch plates 11. In addition, it is possible to achieve smooth contact between the discs 12 and plates 11 due to presence of oil within the grooves 12a.

Reference numerals 14, 15 and 16 denote bearings (ball bearings) that rotatably support the input member 2 or the output member 3 relative to the case 1. In addition, reference numerals 17 and 18 denote oil seals to retain oil with a predetermined viscosity, within the case 1. Accordingly, the power transmitting apparatus 26 is a wet type.

The operation of the power transmitting apparatus 26 of the present invention will be described. When the solenoid 4 is in a non-energized condition (i.e. "OFF" condition), the armature 8 is in a rotatable condition (or sometimes stopped) relative to the rotor 5 due to the presence of the clearance "t" between the rotor 5 and the armature 8. Thus, the boosting mechanism is not activated.

On the contrary, when the solenoid 4 is in an energized condition (i.e. "ON" condition), the magnetic flux generated by the solenoid 4 acts on the armature 8 through the rotor 5. Thus, the armature 8 is attracted and connects onto the rotor 5 against the urging force of the return spring 13. More particularly, while the armature 8 is attracted to the rotor 5 by the magnetic flux, the armature 8 is also progressively rotated toward a same direction as that of the rotor 5 and the balls 9 roll upward along their cam surfaces.

Thus the boosting mechanism begins to display its function. Accordingly, the rotational torque of the housing or the input member 2 is converted to the axial thrusting force acting on the main clutch. Thus, the clutch plates 11 and clutch discs 12 are strongly pressed against each other by the boosting mechanism. Accordingly, the input member or housing 2 and the output member or the shaft 3 are connected via the clutch hub 19. As the result of which, the rotational torque of the input member 2 is transmitted to the output member 3 and thus the output member 3 is rotated together with the input member 2.

Since the reaction force of the thrusting force converted by the boosting mechanism acts to strongly urge the armature 8 against the rotor 5, connection between the armature 8 and the rotor 5 is increased. Thus, according to the power transmitting apparatus of the present invention, since the reaction force of the thrusting force converted by the boosting mechanism acts as the fastening force of the electromagnetic clutch, the pressing force of the armature 8 against the rotor 5, it is possible to reduce the amount of electric current to be supplied to the solenoid 4 once the connection of the electromagnetic clutch has been achieved. Also, it is possible to transmit a large torque due to the strong fastening force of the electromagnetic clutch.

In other words, the fastening force of the electromagnetic clutch can be remarkably increased by using the thrusting force, the reaction force of the thrusting force, generated by the boosting mechanism, as the fastening force of the electromagnetic clutch. Thus, the higher the magnification of the boosting mechanism, the larger the fastening force applied to the electromagnetic clutch. This makes it possible to perfectly unite the rotation of the input member 2 and that of the output member 3.

In addition, since the rotor 5, the armature 8 and boosting mechanism are arranged at the side of the housing or input member 2, it is possible to cancel the fastening force generated by the boosting mechanism and its reaction force toward each other. This reduces the weight and size of the power transmitting apparatus 26 without increasing the rigidity of the case 1. Furthermore, since the armature 8 includes a functioning portion of the boosting mechanism, it is possible to simplify the structure of the power transmitting apparatus 26 and thus to reduce its size.

According to the present invention, the reaction force of the thrusting force converted by the boosting mechanism can be utilized as the fastening force of the electromagnetic clutch. Thus, it is possible to transmit a large torque with a small amount of current supplied to the electromagnet. In addition, the armature includes a functioning portion of the boosting mechanism. Thus, it is possible to simplify the structure of the power transmitting apparatus and thus to reduce its size.

According to the present invention, the boosting mechanism of the power transmitting apparatus can be formed by a conventional cam mechanism. Thus, it is possible to reduce the manufacturing cost of the power transmitting apparatus.

According to the present invention, the return spring has an urging force, which is sufficiently large so as to overcome the thrusting force generated at the boosting mechanism by a dragging torque caused by the return spring during non-energizing of the electromagnet. However, the force is sufficiently small so as to be defeated by the attractive force attracting the armature to the rotor during energizing of the electromagnet. Thus, it is possible to keep a clearance between the armature and the rotor when the solenoid is not energized and to securely attract and fasten the armature and the rotor to each other when the solenoid is energized.

According to the present invention, the rotor is mounted on the input member via a threading engagement therebetween and further fastened thereto by a lock bolt. Thus, it is possible to prevent loosening of the rotor as well as to easily set the clearance between the rotor and the armature.

According to the present invention, the rotor, the armature and the boosting mechanism are rotatably mounted on the side of the input member. Thus, it is possible to cancel the fastening force generated by the boosting mechanism and its reaction force toward each other and thus to reduce the weight and size of the power transmitting apparatus without increasing the rigidity of the case.

According to the present invention, oil is contained within the case. Grooves are formed on the sliding surfaces of the armature and the rotor in the electromagnetic clutch or on the sliding surfaces of the main clutch to guide the oil toward the periphery. Thus, it is possible to smoothly guide and discharge oil present between sliding surfaces of the clutch discs and the clutch plates.

According to the present invention, the main clutch is a multiple disc clutch. Thus, it is possible to set the rigidity and the strength of the components at lower values as compared to those of a conventional single disc clutch having the same transmission capacity.

Although the present invention has been described with reference to the preferred embodiment, the present invention is not limited to such an illustrated embodiment and can be applied to any power transmission apparatus used to any apparatus other than a vehicle. In addition, the boosting mechanism is not limited to the illustrated ball cam type and can be constituted by any other form if it is able to convert a rotational torque of an input member (housing) to an axial thrusting force.

Although it is illustrated in the preferred embodiment that the clutch disc 12 of the main clutch is formed with grooves 12a for discharging oil, it is possible to further form radially extending grooves 8a on the surface of the armature 8 with which the rotor 5 slidably contacts. In addition, similar grooves can be formed on the surface of the rotor 5 with which the armature 8 slidably contacts. Furthermore, it is possible to use any elastic member other than the return spring 13 that has the same urging force.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power transmitting apparatus comprising:
an input member and an output member rotatably arranged within a single case to be secured on a stationary member, the power of the input member can be transmitted to the output member or cut off therefrom by appropriately carrying out connection/cut-off between the input and output members; the power transmitting apparatus comprises:
an electromagnet secured on the case and generating magnetic flux when energized;
an electromagnetic clutch including a rotor for transmitting the magnetic flux, an armature attracted onto the rotor by the magnetic flux transmitted through the rotor, and a return spring arranged between the rotor and the armature and usually axially urging the armature in a direction away from the rotor to create a clearance therebetween when the electromagnet is not energized;
a boosting mechanism for converting a torque of the input member to an axial thrusting force when the armature of the electromagnetic clutch is attracted onto the rotor; and
a main clutch for connecting the input member and the output member via the thrusting force generated by the boosting mechanism and for transmitting the torque of the input member to the output member so that the reaction force of the thrusting force generated by the boosting mechanism can be used as the fastening force of the electromagnetic clutch.

2. A power transmitting apparatus of claim 1 wherein the boosting mechanism comprises a cam surface formed on the armature, and a cam for generating the thrusting force of the boosting mechanism via the movement of the cam surface caused by the attraction and rotation of the armature.

3. A power transmitting apparatus of claim 1 wherein the return spring has an urging force sufficiently large to overcome the thrusting force generated at the boosting mechanism by a dragging torque caused by the return spring when the electromagnet is not energized but is sufficiently small so as to be defeated by the attractive force for attracting the armature onto the rotor during energizing of the electromagnet.

4. A power transmitting apparatus of claim 1 wherein the rotor is mounted on the input member via a threading engagement and further fastened by a lock bolt.

5. A power transmitting apparatus of claim 1 wherein the rotor, the armature and the boosting mechanism are rotatably mounted on the side of the input member.

6. A power transmitting apparatus of claim 1 wherein oil is contained within the case, and grooves are formed on the sliding surfaces of the armature and the rotor in the electromagnetic clutch or on the sliding surfaces of the main clutch for guiding the oil toward their peripheries.

7. A power transmitting apparatus of claim 1 wherein the main clutch is a multiple disc clutch.

* * * * *